United States Patent [19]

Young

[11] 3,951,806
[45] Apr. 20, 1976

[54] CLARIFIER APPARATUS
[75] Inventor: Daniel A. Young, Green Lane, Pa.
[73] Assignee: Ecodyne Corporation, Lincolnshire, Ill.
[22] Filed: Oct. 18, 1974
[21] Appl. No.: 516,310

[52] U.S. Cl. ............................... 210/197; 210/208; 210/209; 210/525
[51] Int. Cl.² ...................... B01D 21/14; C02B 1/20
[58] Field of Search ............ 210/197, 205, 207–209, 210/188, 199, 525

[56] References Cited
UNITED STATES PATENTS

| | | | |
|---|---|---|---|
| 653,684 | 7/1900 | Long | 210/197 |
| 2,506,927 | 5/1950 | Kelly | 210/197 |
| 2,649,412 | 8/1953 | Kivari et al. | 210/197 |
| 2,651,615 | 9/1953 | Kelly et al. | 210/197 |
| 2,669,357 | 2/1954 | Kivell et al. | 210/197 |
| 3,397,788 | 8/1968 | Duff et al. | 210/197 X |
| 3,473,665 | 10/1969 | Duff | 210/188 |
| 3,487,017 | 12/1969 | Thorn et al. | 210/197 X |

Primary Examiner—Charles N. Hart
Assistant Examiner—Robert H. Spitzer
Attorney, Agent, or Firm—Joel E. Siegel

[57] ABSTRACT

Apparatus for feeding the raw influent water into a center post clarifier including an uptake zone defined around the center post forming an eductor tube having an upper and lower end respectively in communication with an upper and lower portion of the mixing and recirculation chamber. A first set of openings is provided intermediate the center post for directing the flow of raw water upwardly into an intermediate portion of the uptake zone. A second set of openings positioned above the first set of openings is provided for directing the remaining flow of raw water from the center post into an upper portion of the uptake zone. The relative flow rates of raw water through the first and second openings being such as to cause sludge which has accumulated adjacent the lower end of the uptake zone to be lifted therein to and recirculated with the raw water. Means are provided to selectively control the flow rates of raw water through the first and second openings to adjust the sludge recirculation rate.

5 Claims, 2 Drawing Figures 3,951,806

CLARIFIER APPARATUS

BACKGROUND AND SUMMARY OF THE INVENTION

The present invention relates to a water treating apparatus and, more particularly, to an apparatus for feeding the influent raw water into a center post clarifier.

It is well known in the water treating and clarification art that suspended solid particles act as "seed" or nuclei to which newly formed precipitates adhere, creating a smaller number of larger, more dense and easily settled particles. Previously formed precipitates act as the "seed" to speed the reactions between the incoming raw water and treatment chemicals. A particularly successful apparatus for clarifying water is disclosed in U.S. Pat. No. 3,473,665, assigned to the same assignee as the present invention. This apparatus hydraulically recirculates settled precipitates or sludge upwardly into an uptake zone for mixing with the incoming raw water and chemical treating agents. Flow control means are provided to compensate for varying liquid throughput rates so as to ensure the presence of an optimum supply of recirculated precipitates to accomplish coagulation and clarification.

Many of the older water and waste treatment plants presently include conventional center post clarifiers which have no provisions for recirculation of sludge and consequently do not operate as efficiently as the apparatus mentioned immediately hereinabove. Previous attempts to upgrade these clarifiers have included the addition of tube settling devices or the reconstruction of the center post, which is the major structural member of the clarifier. These upgrading techniques are not very practical because they involve the installation of additional and/or auxiliary equipment which is very expensive.

Accordingly, it is a primary object of the present invention to provide a center post clarifier which hydraulically recirculates solid precipitates or sludge upwardly into contact with the incoming raw water and added chemical agents.

Another object is to provide such a clarifier which includes means to selectively control the sludge recirculation rate.

A further object of the present invention is to provide a center post clarifier design which hydraulically recirculates solid precipitates or sludge and may be adapted to existing center post clarifiers by the installation of a few inexpensive non-moving parts.

These and other objects are realized in accordance with the present invention by providing a center post clarifier having an uptake zone defined around the center support post forming an eductor tube having an upper and lower end respectively in communication with an upper and lower portion of the mixing and recirculation chamber. A first set of openings is provided intermediate the center post for directing the flow of raw water upwardly into an intermediate portion of the uptake zone. A second set of openings positioned above the first set of openings is provided for directing the remaining flow of raw water from the center post into an upper portion of the uptake zone. The relative flow rates of raw water through the first and second openings being such as to cause sludge which has accumulated adjacent the lower end of the uptake zone to be lifted thereinto and recirculated with the raw water. Unique means are provided to selectively control the flow rates of raw water through the first and second openings to adjust the sludge recirculation rate.

BRIEF DESCRIPTION OF THE DRAWINGS

Other objects and features of the invention will become apparent to those skilled in the art as the disclosure is made in the following description of a preferred embodiment of the invention, as illustrated in the accompanying drawings, in which.

DESCRIPTION OF A PREFERRED EMBODIMENT

Figure 1:
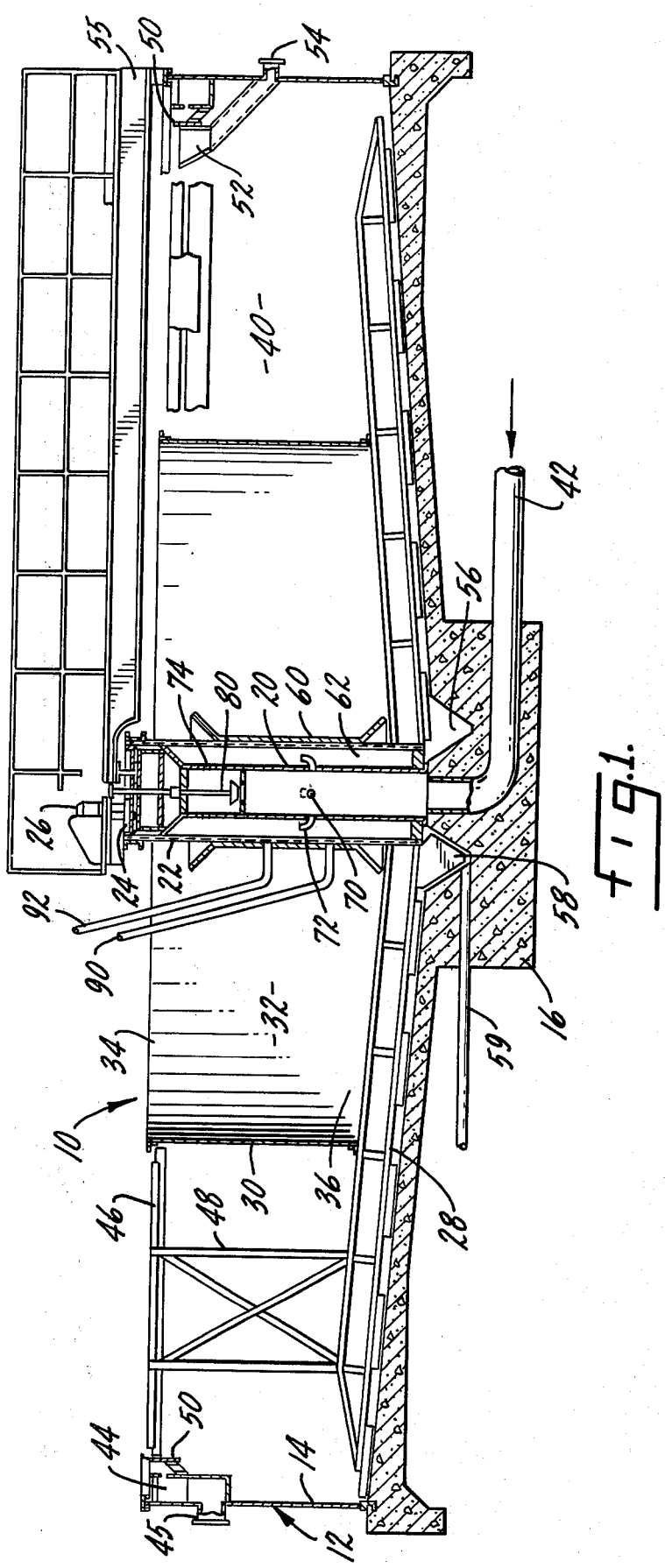
FIG. 1 is a vertical cross-sectional view of a water treating apparatus embodying the features of the present invention.

Referring to FIG. 1, there is illustrated a water treating apparatus, generally indicated by the reference numeral 10, embodying features of the present invention. The apparatus 10 is known in the art as a center post type clarifier, for use in softening water by the cold lime soda ash process, and for the clarification of waters containing suspended solids, color, and organic impurities by coagulation with alum or ferric sulfate or other coagulants. Coagulation and softening may be carried out simultaneously in this type of water treating apparatus.

To soften water by this process, lime (calcium hydroxide) is added to precipitate the calcium bicarbonate as calcium carbonate and the magnesium salts as magnesium hydroxide. Soda ash (sodium carbonate) is added to react with the calcium chloride and calcium sulfate originally present in the water as well as that formed by the reaction of lime with magnesium chloride and sulfate. The reaction of sodium carbonate with these salts forms calcium carbonate. Thus, the hardness (calcium and magnesium salts) originally present in the water is partially removed as the slightly soluble compounds, calcium carbonate and magnesium hydroxide, precipitate.

Usually a coagulant such as alum, sodium aluminate, or ferric sulfate is employed in the treatment to assist in the separation of the turbidity and precipitates formed from the water. If sterilization and reduction in organic matter are required, chlorine is also used in the treatment. By suitable modification in the chemical treatment, silica reduction can be obtained.

The water treating apparatus 10 comprises an open tank 12 having a cylindrical side wall 14 supported above a concrete foundation or bottom 16. Centrally supported above bottom 16 is a vertical, upstanding center support post 20 extending above the level of side wall 14. A structural support cage 22 surrounds post 20 and is spaced therefrom. Cage 22 is rotatable about a vertical axis through gear reducer 24 and motor assembly 26 in a conventional manner. Mounted within a lower portion of tank 12 is a scraper arm assembly 28 secured to and rotatable with support cage 22 to cover the entire bottom 16. A cylindrical partition member 30 is secured to and extends upward from scraper arm assembly 28 defining an annular mixing and recirculation zone 32 therein having an upper portion 34 and a lower portion 36. The partition member 30 and the tank 12 form an annular settling zone 40 therebetween.

Water to be treated enters the water treating apparatus 10 through an inlet pipe 42 which passes through foundation 16 for communication with the lower end of center post 20. Treated effluent is recovered in an annular shaped collector trough 44, positioned at the outer periphery of settling zone 40, and withdrawn therefrom through an effluent outlet line 45. A skimmer arm assembly 46 is supported by scraper arm assembly 28 and rotatable therewith by a skimmer support structure 48. Skimmer arm assembly 46 directs floating scum from settling zone 40 over scum baffle 50 into scum collector 52 from where it is withdrawn through scum outlet pipe 54. A platform or walkway assembly 55 is supported at its respective ends on the top surface of center post 20 and on the upper edge of side wall 14. An annular sludge pit 56 is integrally formed in foundation 16 around center post 20 to receive sludge directed thereinto by scraper arm assembly 28. A sludge paddle plate 58, secured to the underside of scraper arm assembly 28, directs sludge from pit 56 through sludge discharge line 59.

The structure of the water treating apparatus 10, to the extent disclosed hereinabove, is well known in the art as a center post clarifier. The present invention is directed to the adaptation or upgrading of such apparatus to include means for the recirculation of settled sludge from the bottom 16 of tank 12.

Figure 2:
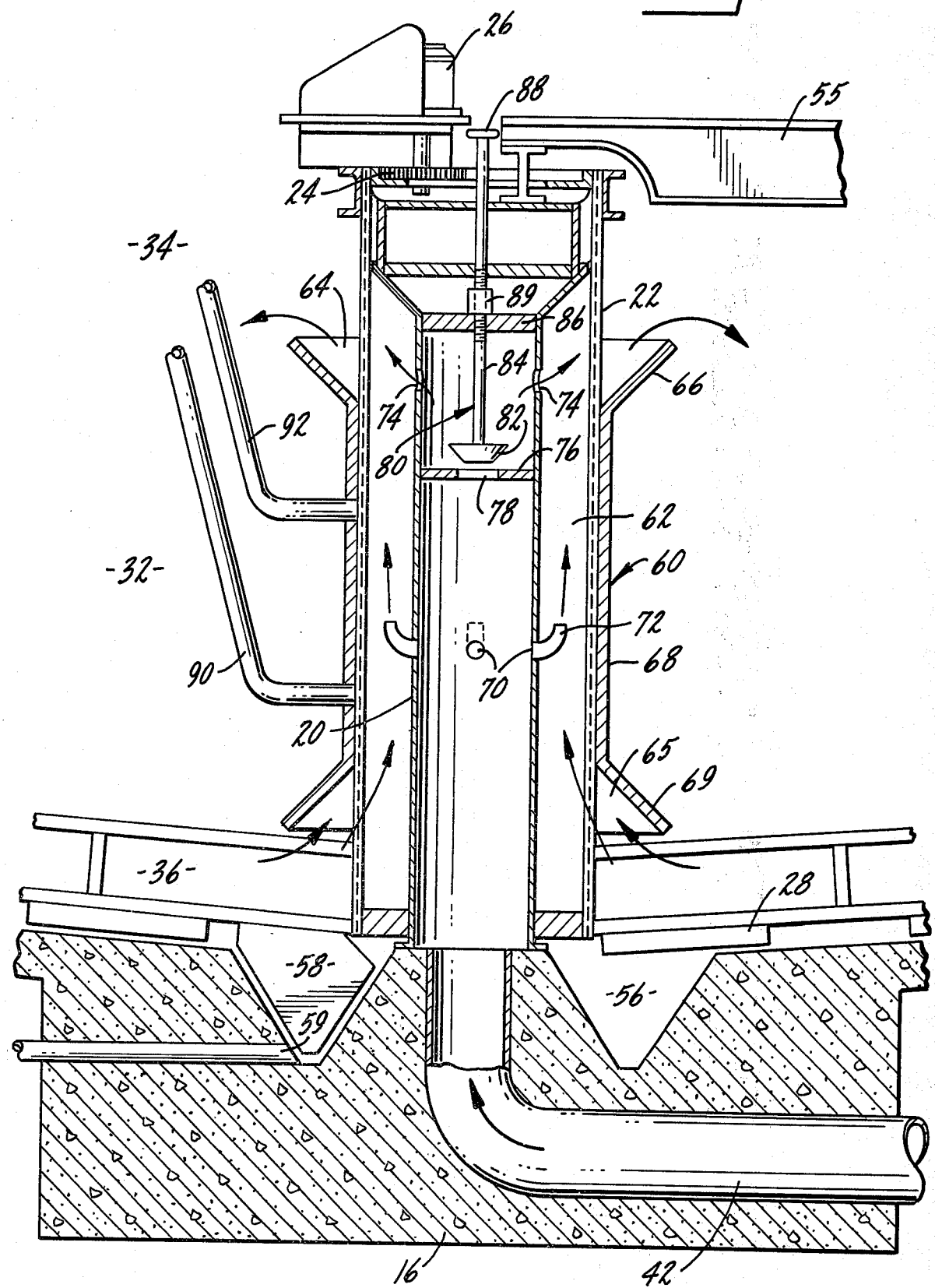
FIG. 2 is an enlarged view of the center support post area as shown in FIG. 1.

Referring to FIG. 2, a generally cylindrical uptake partition member 60 is secured to support cage 22 so as to define an uptake zone 62 which communicates at its upper opening 64 with upper portion 34 of mixing and recirculation zone 32 and at its lower opening 65 with the lower portion 36 of the mixing and recirculation zone a short distance above the scraper arm assembly 28. The upper opening 64 of partition member 60 takes the form of an inverted truncated cone segment 66 which extends upward and outward from the upper end of a substantially vertical tubular segment 68. The lower opening 65 of partition member 60 takes the form of a truncated cone segment 69 which extends downward and outward from the lower end of tubular segment 68.

The center post 20 is provided with a first series of openings 70 radially spaced apart at an elevation a short distance above the elevation of segment 69. Openings 70 are provided with flow control nozzles 72 which turn the liquid flow therethrough to a substantially vertical direction. A second series of openings 74 are formed in center post 20 above openings 70 which are radially spaced apart at substantially the same elevation as segment 66. An annular disc 76 is positioned within post 20 between openings 70 and 74 having an opening 78 therethrough. A flow control plug assembly 80 is mounted within post 20 above disc 76 for selectively controlling the flow of liquid through opening 78, which in turn will control the relative liquid flow rates through openings 70 and 74. Plug assembly 80 includes a stopper member 82 sized to close off liquid flow through opening 78 when in contact with disc 76. A threaded stem 84, secured at its lower end to stopper member 82, is threadedly received through a support member 86, secured within post 20 above openings 74, at an intermediate section thereof. A knob 88 is secured to the upper end of stem 84, which extends to the elevation of platform 55, and is positioned adjacent thereto to facilitate the turning of stem 84 and consequently the raising and lowering of stopper member 82. A locking nut 89 is provided to retain plug assembly 80 in its selected position.

During operation, the raw or influent water enters the water treating apparatus through line 42 and passes upward into center post 20. The influent water is then injected into the uptake zone 62 through openings 70 and 74 in a manner which causes a pumping or lifting action to circulate the sludge from lower portion 36 of the mixing and recirculation zone 32. The precipitates are lifted into cone segment 69 and are mixed with the incoming raw inlet water as they rise through the tubular segment 68 of uptake zone 62. The pumping or lifting action is the result of the relative flow rates of the water entering uptake zone 62 through the openings 70 and 74. When the flow of water through the openings 70 is in the range of 15 to 45 percent of the flow of the water through the inlet pipe 42, the partition member 60 functions as an eductor tube to recirculate the sludge from the bottom of tank 12. The specific relative flow rates of water through openings 70 and 74 are dependent upon the head conditions at the inlet line 42. Under the most usual operating conditions, it is presently considered preferred to direct approximately one-third of the inlet water through the openings 70 and two-thirds through the openings 74. The relative flow rates through openings 70 and 74 are controlled by the raising and lowering of plug assembly 80 relative to opening 78 in disc 76. The reduction of the flow rate through opening 78 is effective to increase the flow rate through openings 70 and conversely decrease the flow rate through openings 74. Flow control plug assembly 80 permits finite adjustment of the relative flow rates through openings 70 and 74 and consequently a finite adjustment of the rate of recirculation of sludge from the bottom area of tank 12. This permits the apparatus 10 to efficiently operate at various head conditions at the inlet pipe 42.

The influent water is additionally mixed with chemicals being added through lines 90 and 92 to cause additional precipitates to be formed. The influent water is pumped upward through the uptake zone 62 and passes over the upper opening 64 into the upper portion 34 of mixing and recirculation zone 32 where further mixing of the water, solids, and chemicals occurs. A substantial part of the water and suspended precipitates from the lower portion 36 of zone 32 is recirculated back through uptake zone 62 in the manner previously described. Part of the water enters the settling zone 40 and rises toward the effluent collector 44. Precipitates and sludge settle out and fall to the bottom 16 of tank 12. The settled precipitates or sludge are moved continuously along the bottom 16 towards the center post 20 by means of the slowly rotating scraper assembly 28 which covers the entire floor area. The accumulations of precipitates are transferred to the sludge pit 56 and removed therefrom through line 59 and passed to waste. The clear water rises to the collector trough 44 and is removed from the water treating apparatus 10 through the outlet line 45.

The present invention permits the upgrading of a conventional center post clarifier to a solids recirculation clarifier by the addition of a partition member 60 to define an uptake zone 62 therein and the provision of openings 70 and 74 in center post 20 in combination with the flow control means 80 to create the eductor effect in uptake zone 62. These additions involve the installation of just a few inexpensive non-moving components. In summary, the present invention makes it economically feasible to upgrade center post clarifiers to achieve the potential improved performance of solids recirculation equipment.

While the embodiment described herein is at present considered to be preferred, it will be understood that various modifications and improvements may be made therein and it is intended to cover in the appended claims all such modifications and improvements as fall within the true spirit and scope of the invention.

What is claimed is:

1. In a water treating apparatus including a hollow center support post, means forming a settling zone, and means forming a mixing and recirculation zone, the lower portion of said mixing and recirculation zone communicating with said settling zone, the lower portion of said center support post communicating with a raw water inlet means and the upper portion of said center support post communicating with said mixing and recirculation zone, means for withdrawing effluent from said settling zone; the improvement comprising: means forming an uptake zone defined around said center support post forming an eductor tube having an upper end in communication with an upper portion of said mixing and recirculation chamber and a lower end in communication with a lower portion of said mixing and recirculation chamber; first openings extending through an intermediate portion of said center support post for directing the flow of raw water upwardly into an intermediate portion of said uptake zone, second openings extending through said center support post and positioned above said first openings for directing the remaining flow of raw water within said center support post into an upper portion of said uptake zone, and means for controlling the relative flow rates of raw water through said first and second openings such as to cause sludge, which has accumulated adjacent the lower end of said uptake zone, to be hydraulically lifted upward through said uptake zone and recirculated with the raw water.

2. The invention as defined in claim 1 wherein said means for controlling the flow rate controls the flow rate of raw water through said first openings in the range of 15 to 45 percent of the flow rate of raw water through said raw water inlet means.

3. The invention as defined in claim 2 wherein said means for selectively controlling the flow rates of raw water through said first and second openings includes a first disc member having an opening therethrough positioned within said center support post between said first and second openings and a plug member movable towards and away from said disc member in closing relationship to said opening.

4. The invention as defined in claim 3 wherein said plug member has a vertical stem secured thereto, said stem being threadedly received through a support member secured within said center support post above said second openings such that rotation of said stem causes vertical movement of said plug member.

5. The invention as defined in claim 1 wherein said first openings include nozzle means associated therewith for increasing the velocity of raw water passing therethrough.

* * * * *